United States Patent
Cato

(10) Patent No.: US 7,529,636 B1
(45) Date of Patent: May 5, 2009

(54) ENABLING SAFE USE OF HIGH POWER LASER FOR LASER MARKING IN A FREE SPACE ENVIRONMENT

(75) Inventor: Robert T. Cato, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/123,004

(22) Filed: May 19, 2008

(51) Int. Cl.
B23K 26/30 (2006.01)
(52) U.S. Cl. .................................................. 702/127
(58) Field of Classification Search ................... 702/127
See application file for complete search history.

(56) References Cited

U.S. PATENT DOCUMENTS

| | | | |
|---|---|---|---|
| 4,084,742 | A | 4/1978 | Silverman |
| 4,835,376 | A | 5/1989 | Drexler |
| 5,229,593 | A | 7/1993 | Cato |
| 5,862,243 | A | 1/1999 | Baker et al. |
| 5,966,457 | A | 10/1999 | Lemelson |
| 6,061,081 | A | 5/2000 | Hasebe et al. |
| 6,354,502 | B1 | 3/2002 | Hagstrom et al. |
| 6,462,303 | B1 | 10/2002 | Brown |
| 6,484,933 | B1 | 11/2002 | Zimmerman et al. |
| 6,932,273 | B2 | 8/2005 | McQueen |
| 7,108,183 | B1 | 9/2006 | Cox, Jr. |
| 7,233,903 | B2 | 6/2007 | Raman et al. |
| 7,295,948 | B2 | 11/2007 | Jetter |
| 2003/0100043 | A1 | 5/2003 | Kalra et al. |
| 2003/0224256 | A1 | 12/2003 | Endo et al. |
| 2004/0091647 | A1 | 5/2004 | Adams et al. |
| 2005/0205673 | A1 | 9/2005 | Morris et al. |
| 2007/0080196 | A1 | 4/2007 | Rozenkranz et al. |
| 2007/0116299 | A1 | 5/2007 | Vanderwall et al. |
| 2008/0023371 | A1 | 1/2008 | Macor |

FOREIGN PATENT DOCUMENTS

| | | |
|---|---|---|
| DE | 10036785 | 3/2001 |
| EP | 1726989 A2 | 11/2006 |
| JP | 2002197549 | 7/2002 |
| JP | 2003317158 | 11/2003 |
| JP | 2007172064 | 7/2007 |
| WO | 2008093006 A2 | 8/2008 |

OTHER PUBLICATIONS

Selecta Duet Nd:YAG Ophthalmic Laser System, Operator's Manual, 2003, Ellex Medical Pty Ltd., chapter 1-6.*

* cited by examiner

Primary Examiner—Tung S Lau
(74) Attorney, Agent, or Firm—Patents on Demand PA; Brian K. Buchheit

(57) ABSTRACT

The present invention discloses a marking system (102) which detects an identifying feature (112) on an item (110) in a field of view (114), and creates a mark or annotation (204, 208) on the item using a laser source (120). While the marking process commences, the system monitors the field of view to detect if the field of view changes in an unacceptable way. Such unacceptable changes include if the item is removed from the field of view or if the field of view has become obstructed (712), potentially creating an unsafe exposure to the laser source. Upon detecting such a condition the laser source is shut down (718) within a prescribed period of time to prevent an unsafe exposure.

6 Claims, 6 Drawing Sheets

ENABLING SAFE USE OF HIGH POWER LASER FOR LASER MARKING IN A FREE SPACE ENVIRONMENT

BACKGROUND OF THE INVENTION

The present invention relates to the field of safely using high power lasers, particularly laser marking systems, and more particularly to marking systems for use in free space environments to safely mark items being processed at the marking system. The present invention also relates to medical uses of high power lasers.

Retail goods are universally labeled with product codes, such as bar codes, which are scanned at a point of sale register to determine a price of the item, as well for inventory control purposes. Typically, items are brought to a point of sale register where a clerk scans the items; however, there are also "self serve" point of sale kiosks which allow the purchaser to scan the items, as well. In the process of scanning items, it is not uncommon to forget to scan an item, or lose track of whether a given item was scanned. To determine if an item has been scanned the clerk will have to read back all the items scanned so far during the check out process and look for the item or count the number of items scanned, which takes time and slows down the check out process. The situation could be worse at self-serve check out kiosks as the purchaser may be concerned that they are being double charged for an item, while at the same time wanting to make sure they are paying for the item.

Another issue with retail sales is loss prevention. Many stores have employees stationed near the store exit to check receipts of purchases to make sure all items have been paid for. However, a receipt is only an indication that an item was paid for, but it does not necessarily ensure that the particular item in possession of the person with the receipt has been paid for as it is possible to pay for one item, return to the store, pick up another identical item, and walk out with it. The person stealing the item can present the same receipt, and the employee checking the receipt has no way of knowing if the item has actually been paid for. Some retailers have employees manually mark the receipt, but this is a less than optimal solution as people can sometimes leave without having their receipt marked during busy periods. Similarly, it is not uncommon for thieves to steal a second, identical item, and attempt to return the stolen item using the original receipt as "proof" of purchase.

The marking procedure where an employee marks the receipt is reasonably effective at stopping some "walk out" theft where a person attempts to walk out with an item identical to one already purchased, but it is far less effective at preventing return losses where a person successfully steals a second item and returns it using the original receipt. Similar issues exist in other environments, such as manufacturing and shipping. Items are moved through specific points and may be scanned Laser marking is commonly used to mark items in controlled environments, such as in manufacturing. Safety concerns in a controlled environment are very different from those of a free space environment, such as a retail environment. Traditionally, a free space environment has restricted laser based applications to those having a minimal exposure risk. For example, the low powered lasers used to scan barcodes during retail transactions not pose a significant risk of injury to humans. Laser marking is by nature using higher powered lasers (designed to burn a physical object to mark it), which poses a significant risk of injury to humans. While some safety procedures exist for high powered laser systems operating in free space in a communication domain, no known laser marking system that incorporates appropriate safety mechanisms to operate in a free space environment exists. A marking system that can be used in a free space environment, such as for marking products at a retail point of sales system, would be beneficial.

BRIEF SUMMARY OF THE INVENTION

A solution comprising a method, computer program product, and system for marking an item in free space with a marking system. In the solution, an identifying feature of the item can be detected while the item is in a field of view of a marking system, which is in a free space environment. The marking process can be commenced that uses a laser source of the marking system. While commencing the marking process, at least a portion of the field of view can be monitored for an unacceptable change. The marking processing can be terminated within a safety period of time when an unacceptable change is detected in the portion of the field of view being monitored. The unacceptable change can include an appearance of an item within the field of view, a removal of an item from the field of view, a change of position of an item within the field of view, a presence of an unexpected heat bloom in the field of view, a presence of a predefined level of smoke in the field of view, and/or a presence of fire in the field of view.

In one embodiment, the free space environment can be a retail environment, wherein the marking system is a component of a point of sale system, wherein said item comprises a product code, and where the marking process is configured to mark the product code as a proof of a completed sale. In one embodiment, data corresponding to the item can be acquired based on the identifying feature. The acquired data can be utilized to inform the marking system about a location and a manner for marking the item during the commenced marking process, whereby the location and the manner for marking are used to adjust at least one marking characteristic, such as a maximum laser strength, a type of mark, and an orientation of a mark.

When the solution is implemented within a computer program product, the computer program product can include a computer usable medium having computer usable program code embodied therewith. The computer usable program code can be configured to cause a machine to perform each of the actions of the solution in accordance with programmatic instructions of the computer usable program code.

When the solution is implemented within a system, the system can include a bus, a memory connected to the bus, and a processor. The memory can be configured to contain a set of instructions. The processor can be connected to the bus. The processor can be operable to execute the instructions of the memory, which results in the processor performing each of the actions of the solution.

The present invention can be implemented in accordance with numerous aspects. One aspect of the present invention can include a marking system for marking an item that includes an optical processor and a laser source. The optical processor can optically detect the presence of an identifying feature of the item in a field of view of a scanner. The optical processor can also monitor the field of view and to generate a reduce laser power signal when an unacceptable change is detected in the field of view. The laser source can mark indicia on the surface of the item in the shape of the desired indicia upon the identifying feature being detected in the field of view of the scanner. The laser source can be configured to automatically terminate a marking process upon receiving the reduced laser power signal generated by the scanner. In one embodiment, the optical processor is configured to detect a product code. In one embodiment, the laser source is configured to mark the indicia such that the indicia at least overlaps the identifying feature. The indicia can be marked at a preselected offset from the identifying feature.

Another aspect of the present invention can include a method of registering an item at a point of sale system as purchased. In the method, a field of view can be scanned for a product code on the item at a product code scanner. The product code can be detected in the field of view. A price for the item can be determined based on the product code. The price of the item can be added to a running purchase total at the point of sale system. A marking process can be commenced to mark the item with a visible annotation. The marking process can be ceased when there is an unacceptable change in the field of view during the marking process. The ceasing of the marking process can be performed within a safety period of time to prevent an unsafe exposure. In one embodiment, the marking process can commence marking the item to create a patterned line on the item. The marking process can include commencing marking the item to create a two dimensional annotation. The marking process further can change a state of a security device associated with the product code. In one embodiment, the marking location can be provided on a substrate on the item, where the substrate can be reactive to a laser source. Additionally, a receipt having a receipt code can be generated. The marking can include a visible annotation corresponding to the receipt code.

DETAILED DESCRIPTION OF THE INVENTION

Figure 1:
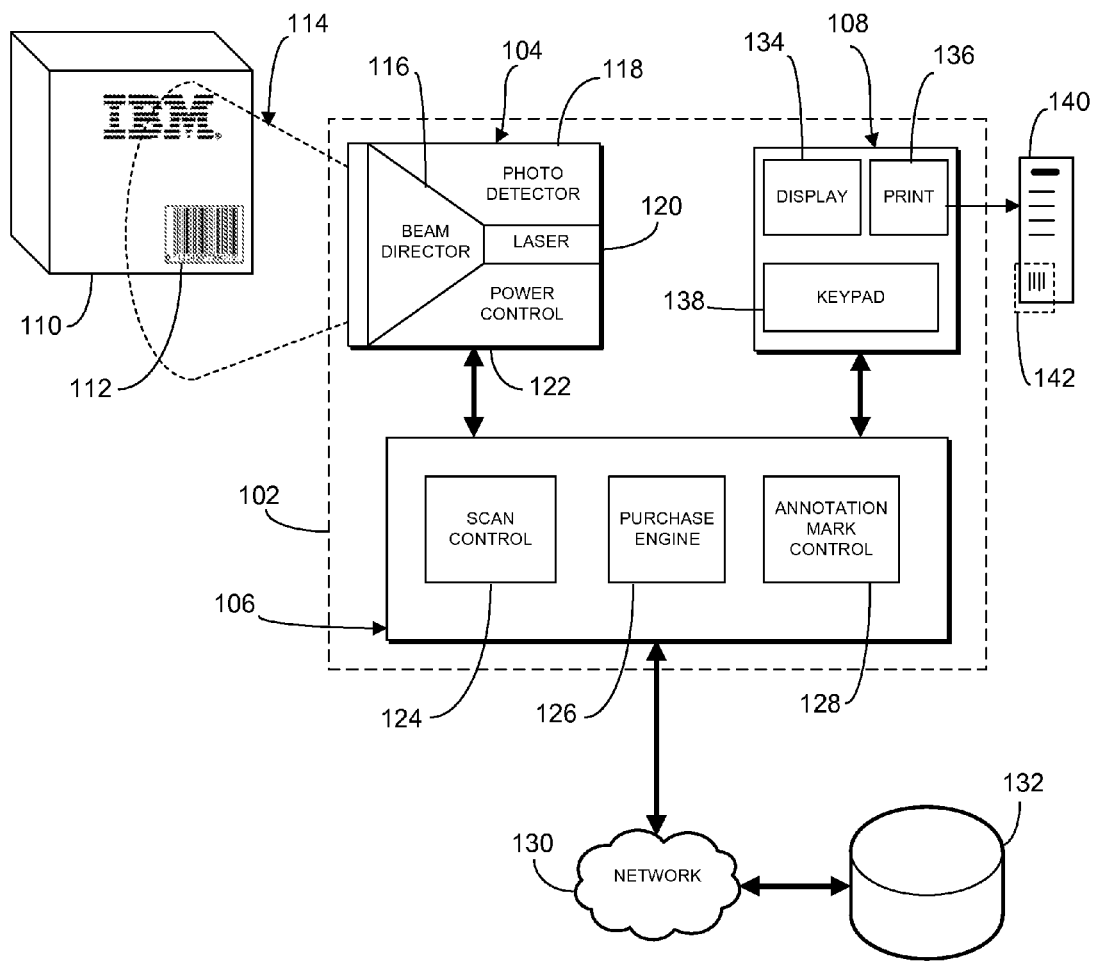
FIG. 1 is a block system schematic diagram of a point of sale system, in accordance with an embodiment of the invention.

The present invention discloses a solution for the problem of ensuring that items being processed at a given station, such as in a retail store, have been processed by safely laser marking them. A means for producing an annotation, or visible marking on the item when it is scanned is provided. In a retail environment, an item is scanned, its price processed, and it is marked at a point of sale system. While the marking is occurring, the system monitors the marking space, and if the item is removed, of if the filed of view becomes obstructed, the laser marking process is shut down in a manner that ensure no unsafe exposure can occur. In one embodiment, the invention includes a scanner for detecting the presence of an identifying feature of an item, such as a product code in a field of view of the scanner. Upon detection of the code, the code is decoded to provide a product identifier. The product identifier is used by a purchase engine to determine a price for the item, and to add the price to a purchase total. Upon successfully recognizing the code, the point of sale system employs a laser marking system to create a visible annotation on the item. While writing the indicia on the item, the field of view is monitored by the system and the marking laser is shut down, or its power reduced if the item is removed from the field of view either by being physically removed or by being obstructed.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. Examples of a computer-readable medium include a semiconductor or solid state memory, magnetic tape, a removable computer diskette, a random access memory (RAM), a read-only memory (ROM), an erasable programmable read-only memory (EPROM or Flash memory, a rigid magnetic disk and an optical disk. Current examples of optical disks include compact disk —read only memory (CD-ROM), compact disk —read/write (CD-R/W) and DVD. Other computer-readable medium can include a transmission media, such as those supporting the Internet, an intranet, a personal area network (PAN), or a magnetic storage device. Transmission media can include an electrical connection having one or more wires, an optical fiber, an optical storage device, and a defined segment of the electromagnet spectrum through which digitally encoded content is wirelessly conveyed using a carrier wave.

Note that the computer-usable or computer-readable medium can even include paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a block schematic diagram of a retail environment 100 including a point of sale system 102, in accordance with an embodiment of the invention. A retail environment 100 is one example of a free space environment where the safe laser marking technology expressed herein is deployed. Other contemplated free space environments can include, but are not limited to, a logistics or inventory management environment, a medical environment, and other environments where space around a laser marking device is loosely controllable. The techniques for enhancing the safety of a laser source 120 capable of marking objects, which thus poses a potential for human injury, can be applied outside the retail context. Retail specific examples provided in retail 100 are for illustrative purposes only and the inventive arrangements disclosed herein are not to be construed as limited in this regard.

As shown, the point of sale system 102 (which is generally an item processing and marking system) includes a means to detect an identifying feature of an item being processed, such as a scan head 104. The system 102 further includes a control unit 106, and an interface unit 108. The point of sale system 102 is used to scan items such as item 110. On each item being scanned is identifying feature, such as a product code 112, which may be a bar code. The product code 112 is an optically readable graphic representation of a product identifier. Bar codes are the most common types of product codes, although numerous other such graphical encoding formats are in use, and may be used with the invention equivalently. More generally, the system 102 may scan for other identifying features, such as distinguishing physical features of the item. The scan head has a field of view 114 in which it scans using, for example, a laser source 120 which produces a beam which is scanned in the field of view by a beam director 116 such as a moving mirror unit or prism, as is well known. A photo detector unit 118 which is responsive to the wavelength of the laser source for detecting and decoding the product code, and producing a digital product identifier upon scanning the product code which is passed to the control unit 106. According to the present embodiment of the invention, a scanner is used for scanning the product code of an item. The scanner is comprised of the scan head 104 and a scan control function 124. Alternative means for identifying the item in the field of view include image capture of the field of view and performing pattern recognition on a present image to find one or more features. In the present embodiment, the scan head further comprises a power control unit 122 which operates the laser source at several power levels. A first power level is used for scanning the field of view and obtaining the product identifier from the scanned product code. A second power level is used, which is a higher power level, to create a mark or annotation on the item being scanned. Equivalently, separate laser sources may be used for scanning and marking, each operated at appropriate power levels. The scan control function 124 comprises the necessary hardware and software elements to control the laser source and photo detector units to acquire product identifiers and control scan timing to ensure items aren't scanned repeatedly, for example. Although shown here as being inside the control unit 106, the scan control function 124 may equivalently be physically co-located in the scan head 104 with the laser source, beam director, and photo detector, as is known.

The system 102 also obtains data related to the item for processing at the system. For example, in the present embodiment, once the photo detector has decoded the product code to acquire the digital product identifier, the product identifier is passed to a purchase engine 126. The purchase engine 126 is operably coupled to the scanner and is configured to, among other functions, determine a price for the item being scanned.

The purchase engine 126 also maintains a running total of the cost of all items scanned for each transaction. Once the product identifier is received from the scanner, the purchase engine 126 queries a price database 132 via network 130 or other suitable connection. Alternatively, the database 132 may be included in the control unit 106. Typically the price database 132 is shared by several point of sale systems operating contemporaneously. The price database 132 cross references product identifiers with product prices in product records. Product records may further include product descriptions for display at the point of sale system, as well as other product related data. Upon receiving the product identifier, the database access the product record using the product identifier as an index, and obtains the product price and any related data, which is returned to the purchase engine 126 and added to the running total for the present transaction. The purchase engine 126 is comprised of appropriate hardware and software elements for acquiring prices and maintaining the running or transaction total. It will also compute tax, delete prices for items accidentally scanned twice or not being purchased, and so on.

Upon a successful scan of the product code 112, the point of sale system 102, in accordance with the invention, marks the item using a laser source. That is, a mark, or annotation, is produced on the item by ablating material in the item. Since the product code is being scanned, its location in the field of view can be easily determined and used as a reference location to produce the annotation. Under control of the annotation mark control function 128, the laser power is sufficiently increased to produce a mark on the item. The mark may result, for example, from the material being etched or burned, or the product code being disposed on a substrate that is reactive to the laser beam at the higher power, such as a thermochromic, or thermal paper. The annotation may be produced using the beam director 116 which is directed and moved in conjunction with operation of the laser source at the higher power to produce the desired pattern or shape. Alternatively, a static beam shaper may be used which produces beam dispersion in the desired shape or pattern. The annotation controller must operate the laser source in a safe manner, to prevent injury to the operator of the point of sale system. Numerous studies have been done which have determined maximum safe exposure levels with respect to time. For example, U.S. Pat. No. 5,229,593, titled "Apparatus and Method for Safe, Free Space Laser Communication," which is hereby incorporated by reference, provides a chart indicating safe exposure levels for a given exposure time. As a first measure of safety, the annotator control allows high power laser operation only when the product code is in the field of view 114. By "in the field of view" it is meant that the product code is not only physically present in the optical range of the scanner, but that there is a clear, unblocked path between the scanner and the product code. Of course, when the product code is first detected, it is then in the field of view of the scanner. The annotation may be made immediately upon detection of the product code with some assurance that in the time it takes to create the annotation the optical path will remain clear. Alternatively, the laser source may be pulsed between the low power scan mode and the high power marking mode to maintain assurance that the optical path is clear. If the product code moves out of the field of view, by being physically removed, or blocked from view of the scanner, during the annotation process, the process is ceased to prevent any potential excessive exposure to the operator.

As the item is being scanned, marked, and its price fetched and added to the purchase transaction total, the operator of the point of sale system may use the interface unit 108 to monitor and adjust or complete the transaction. Typically a display 134 is used to display at least the price of the item presently being scanned, and may include additional transaction information, such as a running total, a record of items previously scanned and their prices, and so on, as is known. A keypad or button console or other tactile input 138 is used by the operator and read by the control unit 106 to adjust items and complete the transaction. A printer 136 maybe used to generate a receipt 140 as a record of the transaction. In one embodiment of the invention, the point of sale system determines a code or other data 142 to be printed on the receipt. The code 142 is selected to correspond with a code used as the annotation. The code 142 may be printed in a scanable format so that if the item 110 is brought back for a return, the annotation made on the item may be checked against the code 142 on the receipt to verify that it is the same item that was purchased in order to prevent fraudulent returns.

Figure 2:
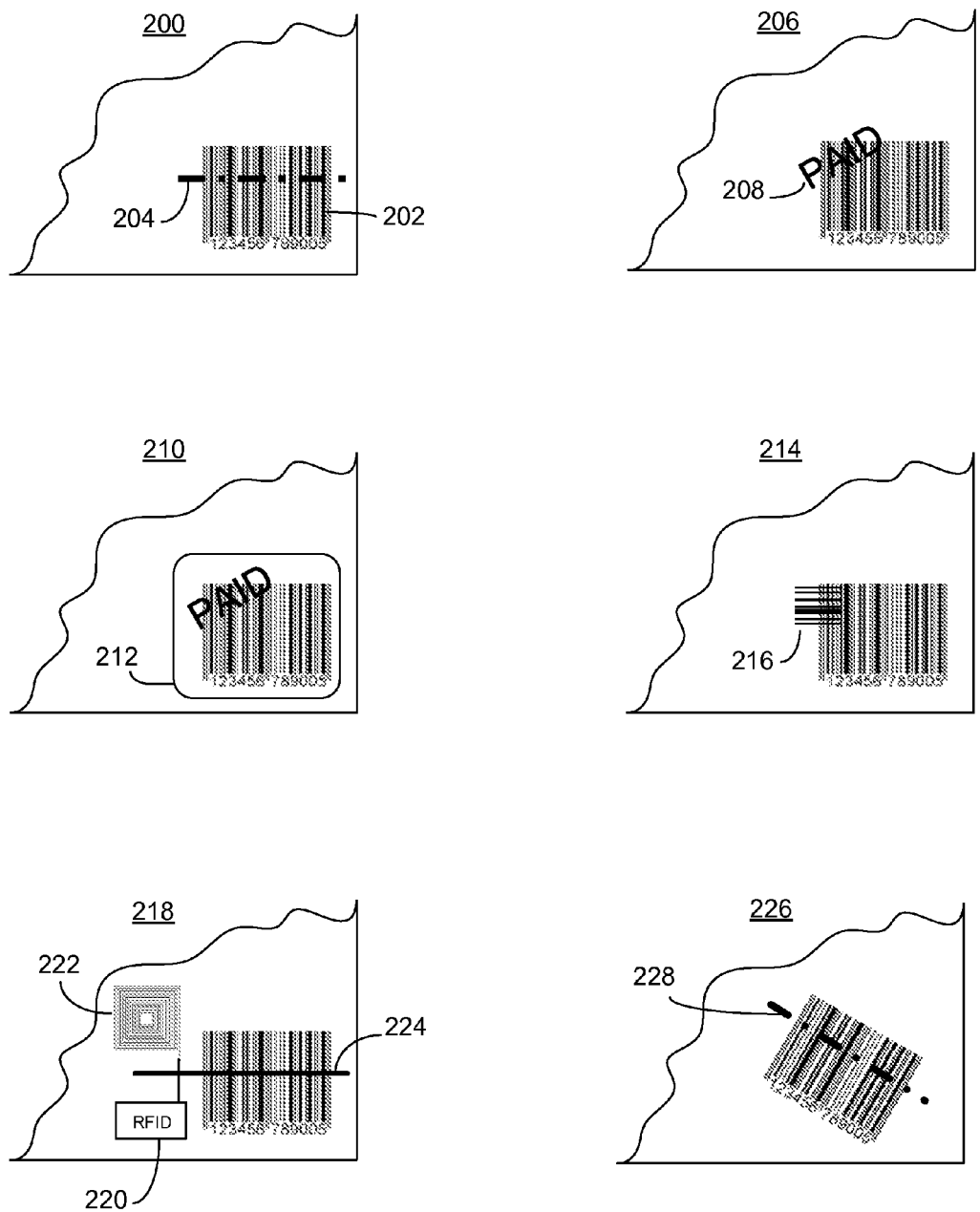
FIG. 2 shows various marks which may be made by a point of sale system, in accordance with an embodiment of the invention.

FIG. 2 shows a series of various marks which may be made by a point of sale system, in accordance with an embodiment of the invention. A first mark 200 shows a patterned line 204 made over the product code 202. A straight, unbroken line may also be used. A second mark 206 shows a two-dimensional mark 208, such as a word. Other two-dimensional marks include logos, icons, alphanumeric strings, and other designs.

A third mark 210 is made on a substrate 212 on which the product code is disposed. The substrate may be reactive to the laser source, and may thus allow the laser to operate at a lower power level than may be necessary otherwise. The substrate may be, for example, thermochromic paper. Alternatively, the substrate may be used to provide consistent ablation depth, rather than marking on the product material or packaging, which varies from product to product. Presently product codes are printed on a wide range of materials. These materials may have different responses to the laser source such, for a given power level, the annotation may be faint on some items and excessive on others. If the same substrate is used on all items, then the power level of the laser may remain the same and the annotations will be consistent from item to item. Alternatively, the database 132 may, in addition to product price, include a power level parameter to be used by the laser in making the annotation. The power level parameter for each item in the database having been selected based on the material on which the product code is disposed to ensure consistent annotation results among items.

A fourth mark 214 shows how the annotation may be itself a code 216 which may be scanable. The code 216 may correspond to a code 142 printed on the paper receipt 140 generated at the end of the transaction. In a fifth mark 218 the annotation may change the state of a security device, such as a radio frequency identification (RFID) chip 220. For example, a conductive link between an antenna 222 and the chip 220 may be broken by an annotation line 224, which partly overlaps the product code. By breaking the link between the antenna and the chip, the chip will be unable to respond to queries such as those provided by security equipment at the exits of retail establishments. A sixth mark 226 show how the annotation 228 may be created in correspondence with the orientation of the product code. Upon detecting the product code, the orientation of the code in the field of view may be determined, and tracked as the annotation is made, so that the beam director 116 can track with the change in orientation as well as position while the annotation is being made. Alternatively, the annotation may be made without regard to orientation with respect to the product code.

Figure 3:
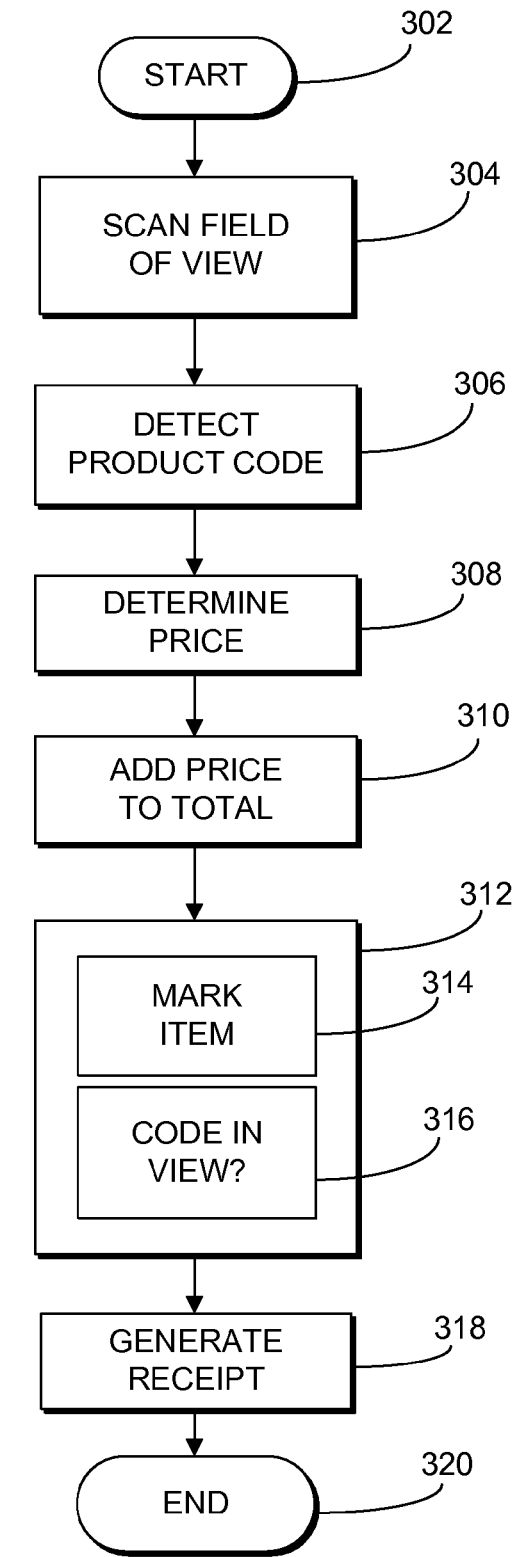
FIG. 3 show a flow chart diagram of a method of marking an item at a point of sale, in accordance with an embodiment of the invention.

FIG. 3 shows a flow chart diagram 300 of a method of marking an item at a point of sale, in accordance with an embodiment of the invention. Although shown here as being embodied in a point of sale system, those skilled in the art will realize the invention is not so limited, and may have numerous applications outside of point of sale systems. A generalized system embodying the invention will detect the presence of an item or workpiece in a field of view of a laser marking device. The system can detect features of the item, such as by optical recognition, low power radio identification, physical sensors, and so on. The features so detected may include a code or pattern disposed on the item, or received from the item via a radio signal, and are used by the system to access a database to acquire parameters or data corresponding to the detected features. The information acquired from the database is used by the system to process the item, including marking an annotation on the item via a laser source.

As the invention us embodied in an exemplary point of sale system, at the start 302 of the method, the point of sale system is ready to detect or scan an item, or a next item. A variety of methods may be employed to detect the item, including optical recognition. In the present exemplary point of sale system, a laser scanning method is employed. The laser is being scanned (304) at a scanning power level in the field of view as the photo detector attempts to locate a specific feature of the product, such as a product code, being illuminated by the beam. Alternatively a light source may be used to generally illuminate the item, and machine vision and pattern recognition may be used to find the code in an image of the field of view. The code may be, for example, a bar code, or other graphical code. When the portion of the item having the product code is moved into the field of view, the photo detector detects the product code (306). The product code is decoded by the scanner to acquire a product identifier, which is used by the point of sale system to determine the price of the item (308). Once the price is acquired, it is added to running total of the purchase or transaction (310). Subsequent to detecting the product code in the field of view, the point of sale system beings a marking process 312 to create a mark or annotation on the item. The process involves increasing the output power of the laser, or using a second laser operated at power level sufficient to create the desired mark, while directing the output of the laser onto the item in a manner which results in the desired annotation. The marking process may use a scanning method where the beam is scanned or directed across the surface, such as by a movable mirror or beam deflector. Alternatively, an optical patterning tool, such as a diffraction grating, may be used to shape the beam into a desired shape, allowing a single pulse of sufficient power to create the annotation. While generating the annotation, the point of sale system periodically may check to ensure the product code is still in the field of view (316), and if not, cease the marking process. Although shown here as occurring after the price has been added to the purchase total, the marking process may commence anytime once the product code has been detected in the field of view of the scanner. Once the purchase has been completed, the point of sale system generates a receipt (318) which may include a code or other indicia corresponding to the annotation made on the item. Once the receipt is generated, if necessary, the method terminates (320).

The invention generally embodies a marking system configured to mark an item with an annotation. The marking system detects an identifying feature of the item while the item is in a field of view of the marking system. An identifying feature is a feature which identifies the item. Examples of identifying features include graphical images, logos, codes, as well as physical features. To detect the feature the system may employ, for example machine vision pattern recognition, bar code scanning, to name two examples. Upon detecting the feature, the marking system uses the identifying feature to acquire item data corresponding to the identifying feature from an item database. In an exemplary embodiment, the identifying feature may be a bar code, which provides a product identifier. The marking system, subsequent to detecting the identifying feature, creates a graphical annotation on the item using laser ablation on a surface of the item. The graphical annotation is visible, and indicates the item has been processed at the marking system. The marking system applies the item data to a reporting record maintained at the marking system. The reporting record may be, for example, a purchase record which may be printed on a receipt upon conclusion of a retail transaction.

Figure 4:
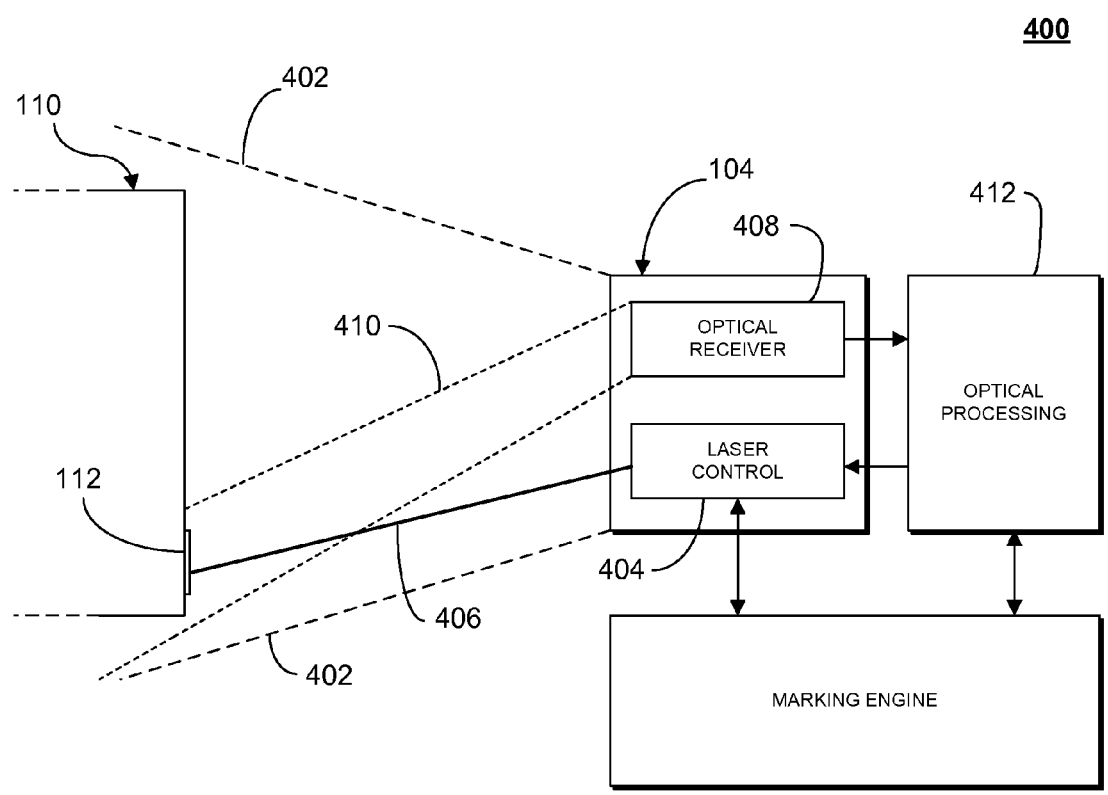
FIG. 4 shows a schematic view of a marking system field of view and the optical system defining the field of view, in accordance with an embodiment of the invention.

Referring now to FIG. 4, there is shown therein a schematic view 400 of a marking system field of view and the optical system defining the field of view, in accordance with an embodiment of the invention. The item 110 being processed has an identifying feature 112, such as a graphical product code. When the item is present in a field of view, indicated by boundaries 402, a scanner 104 is configured to detect the identifying feature. A laser source operated by a laser controller 404 produces a beam 406 which is used to create a mark on the item. Such a mark can be made via ablation or by affecting a change in appearance such as color or texture. The laser controller directs the beam over time to draw the mark in the desired shape at the desired location on the surface of the item being processed. During the marking process, an optical receiver 408 monitors the field of view. In one embodiment of the invention, the field of view monitored during the marking process may be a sub-field, limited to the area in which the marking is occurring, as indicated by boundaries 410. The visual information produced by the optical receiver is processed by an optical processor 412. The optical processor may produce tracking information for use by the laser controller 404 so that, if the item is in motion, the laser controller can adjust the beam direction accordingly. Furthermore, the optical processor determines if the item has been removed from the field of view. That is, whether the item has been physically removed from the field of view, or if the view of the item has become obscured. The optical receiver may be sensitive to a wide spectrum of light, including infrared light. Accordingly, the optical processor can determine if a heat bloom appears in the field of view that is consistent with human body temperature. Upon detecting that the item is no longer in the field of view, that it has become obscured, or if there is an indication of a human body in the field of view, the optical processor outputs a shutdown signal to the laser controller which causes the laser controller to reduce the laser power or shut it off within a safety time period to prevent a potentially unsafe exposure to the laser.

Figure 5:
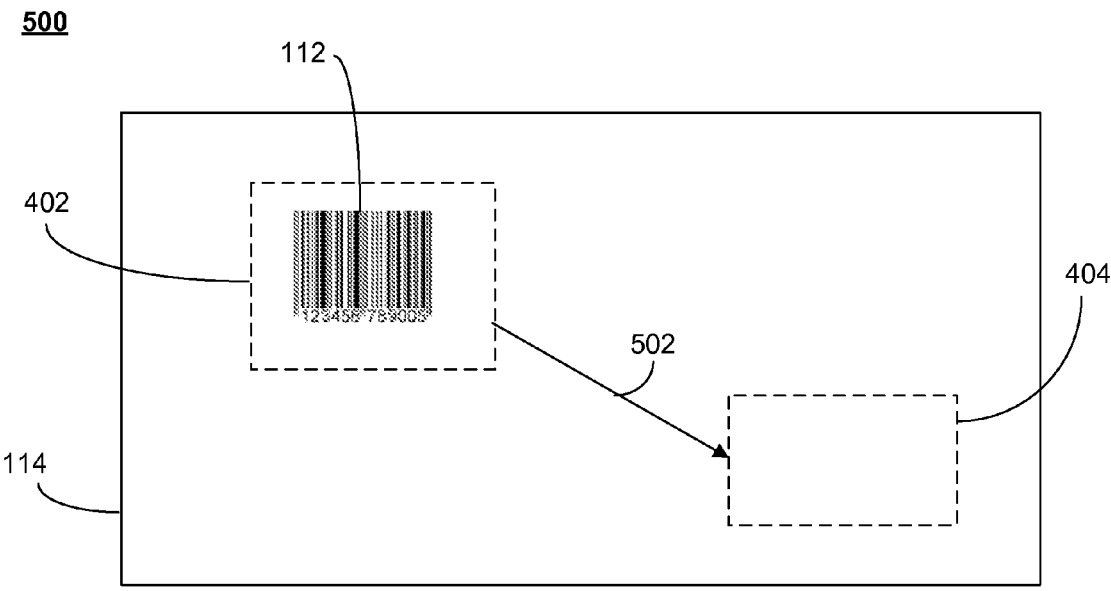
FIG. 5 shows an unobstructed field of view of a marking system in accordance with an embodiment of the invention.

FIG. 5 shows an unobstructed field of view 500 of a marking system in accordance with an embodiment of the invention. The boundary of the field of view 114 defines the work area. When an item is placed in the field of view, an identifying feature such as a barcode 112 appears and is detected by the optical processing components. Upon detecting the identifying feature, the system may commence marking it as shown, for example, in FIG. 2. A smaller field of view 402 may be observed where the marking is occurring. Alternatively, the marking may be performed at another location on the item, as determined by a preselected offset 502 with respect to the identifying feature.

Figure 6:
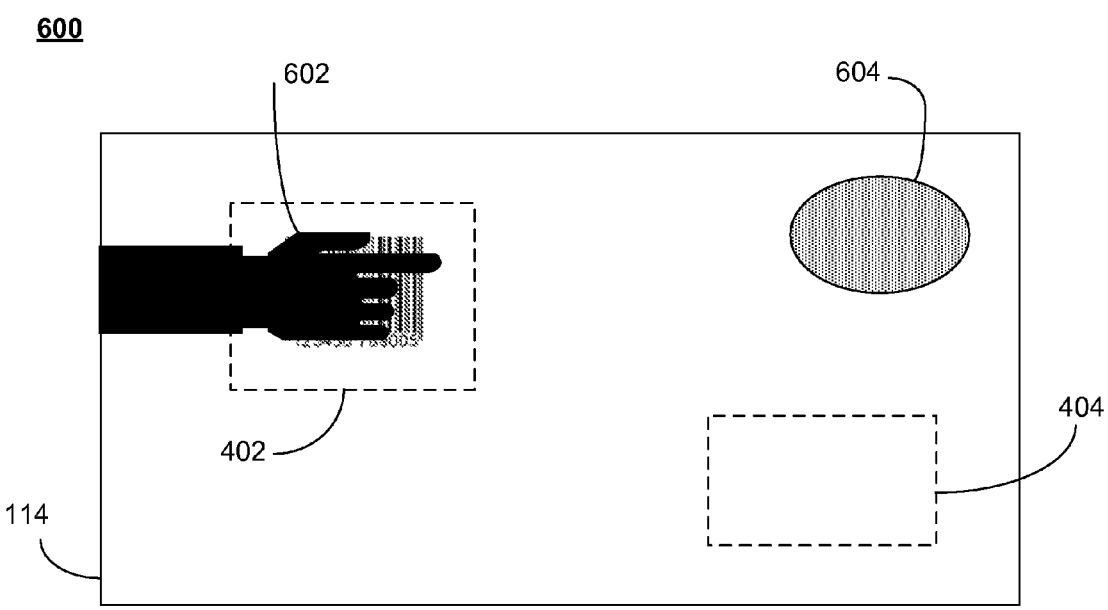
FIG. 6 shows an obstructed field of view of a marking system in accordance with an embodiment of the invention.

FIG. 6 shows an obstructed view 600 of the work area. A obstruction 602 obscures the identifying feature, which would prevent, for example, decoding of a bar code, or cause a pattern recognition process to be unable to track or sufficiently recognize the feature. The optical processing components may be configured to detect infrared sources, such as a heat bloom 604 which is consistent with human body temperature, in the field of view. The detection of a sufficient heat bloom may then be used to trigger sending the shutdown signal to the laser controller. Other obstruction detection techniques can be used based upon any of a variety of sensors, including beam breakage sensors, pressure sensors, audio sensors, and the like. These sensors can be used singularly or combinatively, such as in cooperation with a heat bloom 604 detector, to provide any desired accuracy level for obstruction 602 detection while having an acceptable margin of error for false positives given the specific application of the laser marking device. In many applications, use of a heat bloom 604 detection sensor for detecting obstructions 602 alone may result in too many false positives, as heat from a laser source and a partially marked objects may be improperly interpreted as obstructions 602. In one embodiment, sophisticated image processing techniques can be employed to ensure that heat from a human body part is distinguishable from other heat generating sources.

Figure 7:
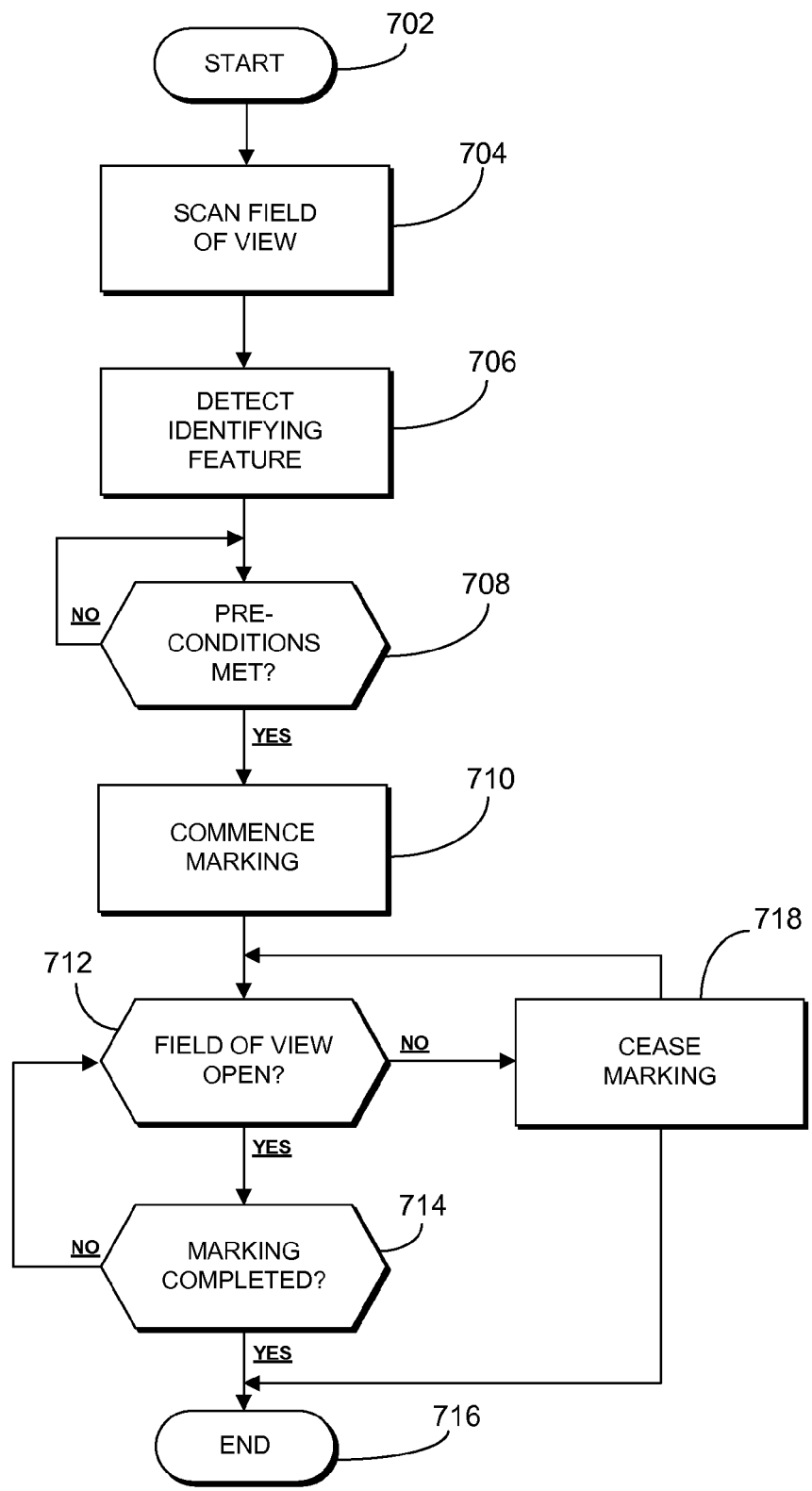
FIG. 7 shows a flow chart diagram of a method of marking an item, in accordance with an embodiment of the invention.

Referring now to FIG. 7, there is shown a flow chart diagram 700 of a method of marking an item, in accordance with an embodiment of the invention. The present flow chart emphasizes how the invention monitors the field of view during the marking process, and controls operation of the laser output to prevent a potentially unsafe exposure. At the start 702, the marking system is ready to process an item. Accordingly, the system commences scanning a field of view (704) to detect an identifying feature of an item. The detection may be performed by, for example, scanning a laser in the field of view to detect a product code, or the marking system may use imaging and pattern recognition to search images of the field of view for patterns correlating to known identifying features. When an item is moved into the field of view, then the system detects the identifying feature (706). Different features may be used corresponding to different items, or to indicate particular characteristics of the item. After detecting the presence of the item in the field of view, the system may check to determine if any pre-conditions have been satisfied before commencing with the marking process (708). For example, in the case of the marking system being a point of sale system, the marking process may be commenced upon the product code being successfully decoded. Subsequently, the system commences marking the item (710), using the laser source to draw or write a specified mark or pattern on a surface of the item Since the mark is intended to be a pattern or shape, the beam will be scanned across the surface by the beam director 116. During the time the beam is scanned in the desired pattern, the system continues monitoring the field of view to determine if there is any obstruction or of the item has been removed from the field of view (712). While the field of view is clear, and the identifying features are still in view of the system, the marking commences until it is completed (714) and the method ends (716). If the system detects an obstruction, or if the item is removed, which has the same effect as obstructing the view, or if the system detects other indication of a potentially unsafe situation, such as a heat bloom in the field of view consistent with human body temperature, then the system ceases the marking process (718). The system is designed to shut down within a safety period of time so that any exposure to the laser source will not cause injury. The safety time may be dictated by, for example class 1 limits for laser operation as specified by the American National Standards Institute specification ANSI Z136.1-1993. Once the marking stops, the process may simply terminate (716), or the method may wait until the field of view to become unobstructed for a period of time, as indicated by the return arrow to box 712.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of marking an item in free space with a marking system comprising:

detecting an identifying feature of the item while the item is in a field of view of a marking system, which is in a free space environment;

commencing a marking process using a laser source of the marking system;

while commencing the marking process, monitoring at least a portion of the field of view for an unacceptable change; and terminating the marking processing within a safety period of time when an unacceptable change is detected in the portion of the field of view being monitored, wherein the unacceptable change comprises at least one of an appearance of an item within the field of view, a removal of an item from the field of view, a change of position of an item within the field of view, a presence of an unexpected heat bloom in the field of view, a presence of a predefined level of smoke in the field of view, a presence of fire in the field of view;

wherein said item comprises a product code, wherein said marking process is configured to mark the product code as a proof of a completed sale.

2. The method of claim 1, further comprising:

acquiring data corresponding to the item based on the identifying feature; and utilizing the acquired data to inform the marking system about a location and a manner for marking the item during the commenced marking process, whereby the location and the manner for marking are used to adjust at least one marking characteristic, such as a maximum laser strength, a type of mark, and an orientation of a mark.

3. A computer readable medium for marking an item in free space with a marking system, the computer program product comprising:

a computer usable medium having computer usable program code embodied therewith, the computer usable program code comprising:

computer usable program code configured to detect an identifying feature of the item while the item is in a field of view of a marking system, which is in a free space environment;

computer usable program code configured to commence a marking process using a laser source of the marking system;

computer usable program code configured to monitor at least a portion of the field of view for an unacceptable change while commencing the marking process;

and computer usable program code configured to terminate the marking processing within a safety period of time when an unacceptable change is detected in the portion of the field of view being monitored, wherein the unacceptable change comprises at least one of an appearance of an item within the field of view, a removal of an item from the field of view, a change of position of an item within the field of view, a presence of an unexpected heat bloom in the field of view, a presence of a predefined level of smoke in the field of view, a presence of fire in the field of view;

wherein the free space environment is a retail environment, wherein the marking system is a component of a point of sale system, wherein said item comprises a product code, wherein said marking process is configured to mark the product code as a proof of a completed sale.

4. The computer program product of claim 3, further comprising:

computer usable program code configured to acquire data corresponding to the item based on the identifying feature; and computer usable program code configured to utilize the acquired data to inform the marking system about a location and a manner for marking the item during the commenced marking process, whereby the location and the manner for marking are used to adjust at least one marking characteristic, such as a maximum laser strength, a type of mark, and an orientation of a mark.

5. A system for marking an item in free space with a marking system comprising:

at least one laser source; and a control unit for the laser source, wherein said control unit is configured to:

detect an identifying feature of the item while the item is in a field of view of a marking system, which is in a free space environment;

commence a marking process using the laser source of the marking system;

monitor at least a portion of the field of view for an unacceptable change while commencing the marking process; and terminate the marking processing within a safety period of time when an unacceptable change is detected in the portion of the field of view being monitored, wherein the unacceptable change comprises at least one of an appearance of an item within the field of view, a removal of an item from the field of view, a change of position of an item within the field of view, a presence of an unexpected heat bloom in the field of view, a presence of a predefined level of smoke in the field of view, a presence of fire in the field of view;

wherein the free space environment is a retail environment, wherein the marking system is a component of a point of sale system, wherein said item comprises a product code, wherein said marking process is configured to mark the product code as a proof of a completed sale.

6. The system of claim 5, wherein the control unit is further configured to:

acquire data corresponding to the item based on the identifying feature; and utilize the acquired data to inform the marking system about a location and a manner for marking the item during the commenced marking process, whereby the location and the manner for marking are used to adjust at least one marking characteristic, such as a maximum laser strength, a type of mark, and an orientation of a mark.

* * * * *